(12) United States Patent
Tawa et al.

(10) Patent No.: US 6,201,229 B1
(45) Date of Patent: *Mar. 13, 2001

(54) LIGHT INTENSITY CONVERTER

(75) Inventors: Fumihiro Tawa; Shinya Hasegawa, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/128,656

(22) Filed: Aug. 4, 1998

(30) Foreign Application Priority Data

Mar. 9, 1998 (JP) .................................. 10-057003

(51) Int. Cl.$^7$ ............................................ G02B 7/04
(52) U.S. Cl. .................. 250/201.5; 250/216; 359/719
(58) Field of Search .......................... 250/214.1, 216, 250/205, 201.5; 359/708, 718, 719; 369/44.12, 44.14, 112, 44.11, 44.24, 44.23

(56) References Cited

U.S. PATENT DOCUMENTS

| | | | |
|---|---|---|---|
| 5,467,335 | 11/1995 | Braat | 369/100 |
| 5,553,174 | 9/1996 | Snyder | 385/15 |
| 5,898,167 | * 4/1999 | Musha et al. | 250/201.5 |

FOREIGN PATENT DOCUMENTS

| | | |
|---|---|---|
| 4212892A1 | 4/1992 | (DE) . |
| 0455249A2 | 11/1991 | (EP) . |
| 3-75612 | 3/1991 | (JP) . |
| 3-92815 | 4/1991 | (JP) . |
| 6-223401 | 8/1994 | (JP) . |
| 2900648 | 3/1999 | (JP) . |

* cited by examiner

Primary Examiner—Que T. Le
(74) Attorney, Agent, or Firm—Armstrong, Westerman, Hattori, McLeland & Naughton

(57) ABSTRACT

The light intensity converter comprises a transparent body including opposite first and second curved surfaces. The body is surrounded by an outer peripheral surface extending between the first and second curved surfaces. The body of the converter is arranged such that the incident light is made incident to the body at the first curved surface and emerges from the second curved surface. The incident light diverges in a certain area and converges in another area, by refraction, so that the light intensity distribution of the incident, first curved surface is converted into a different light intensity distribution while the light travels through the converter, and thus exits from the second curved surface.

14 Claims, 10 Drawing Sheets

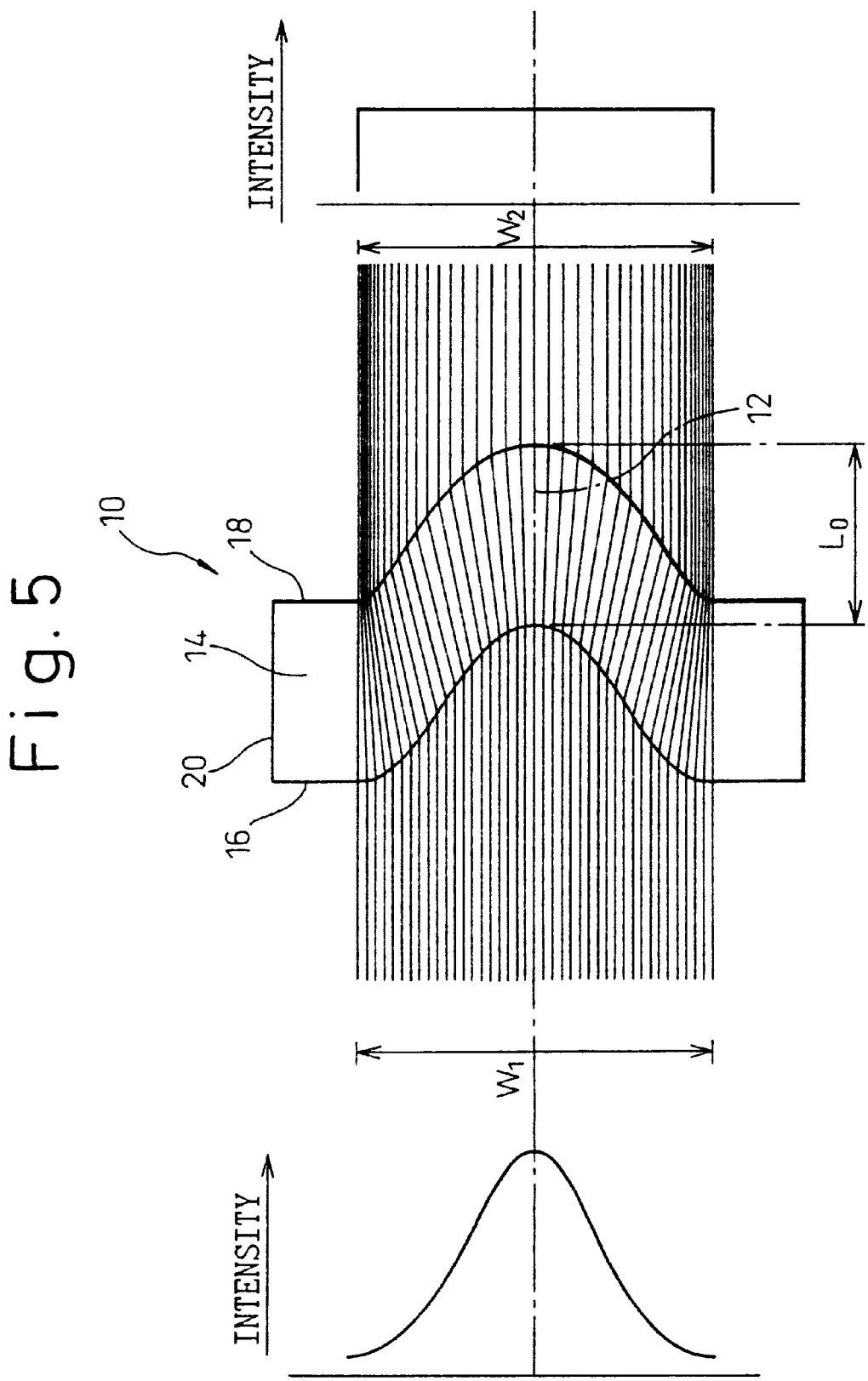

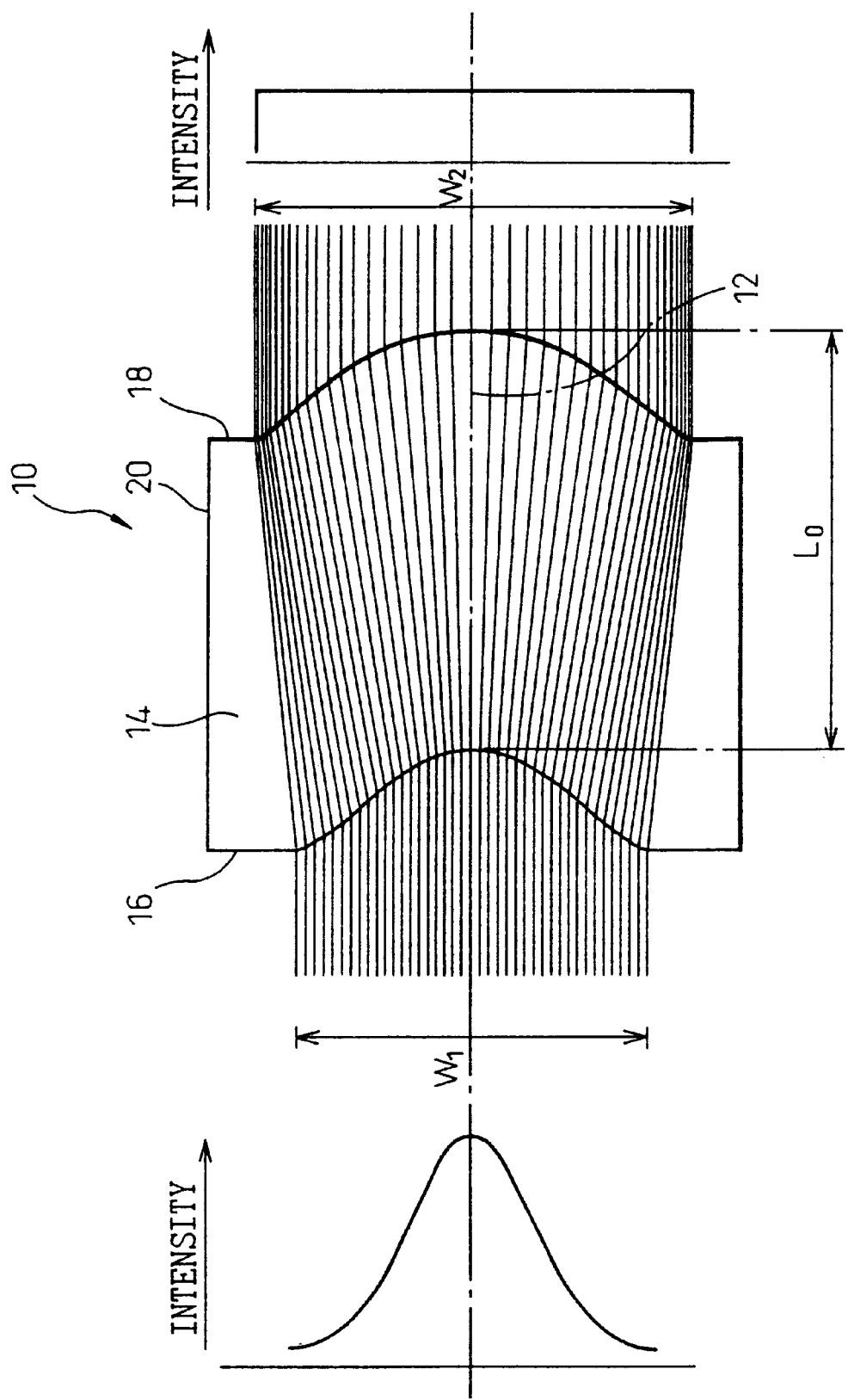

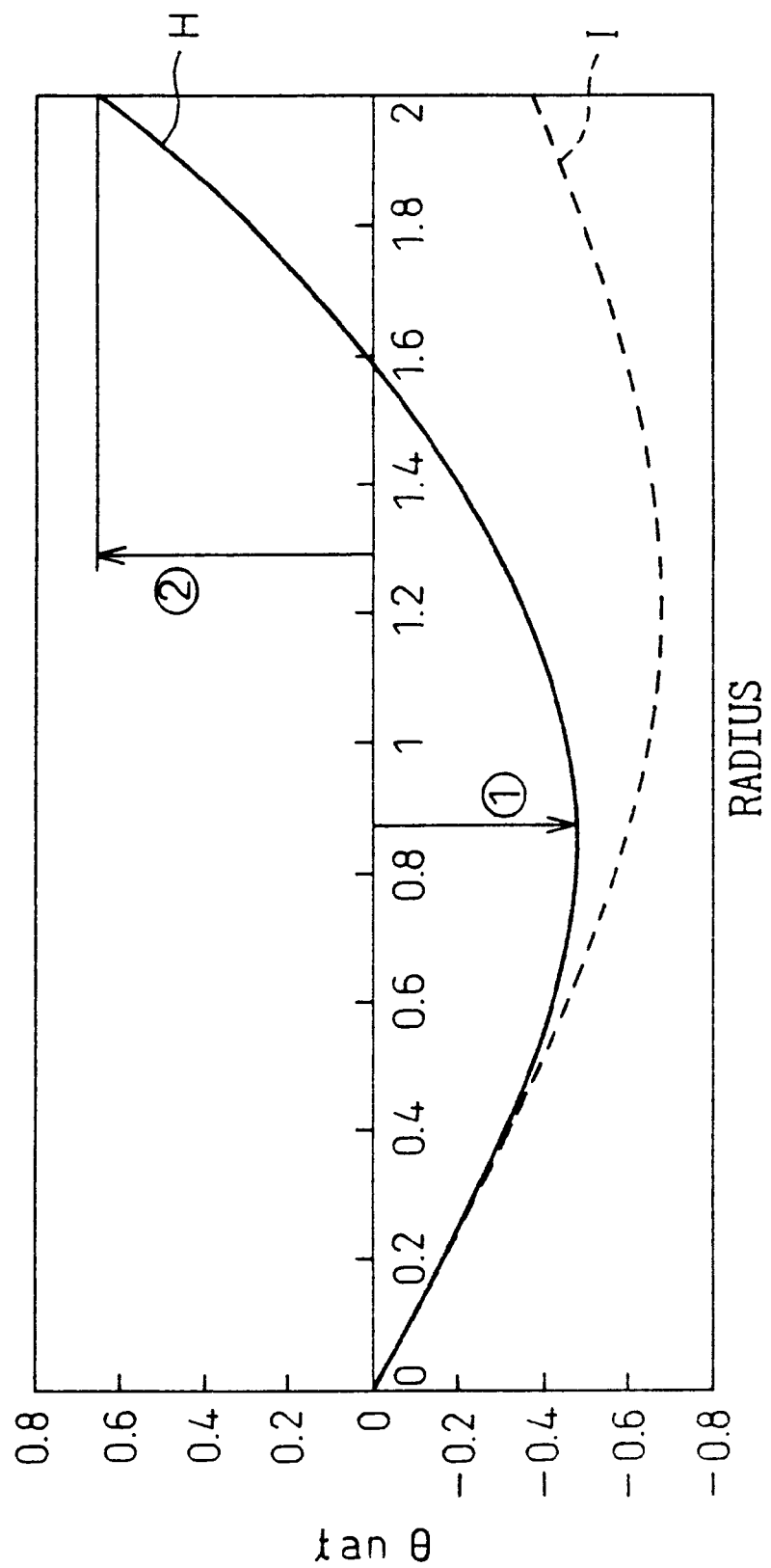

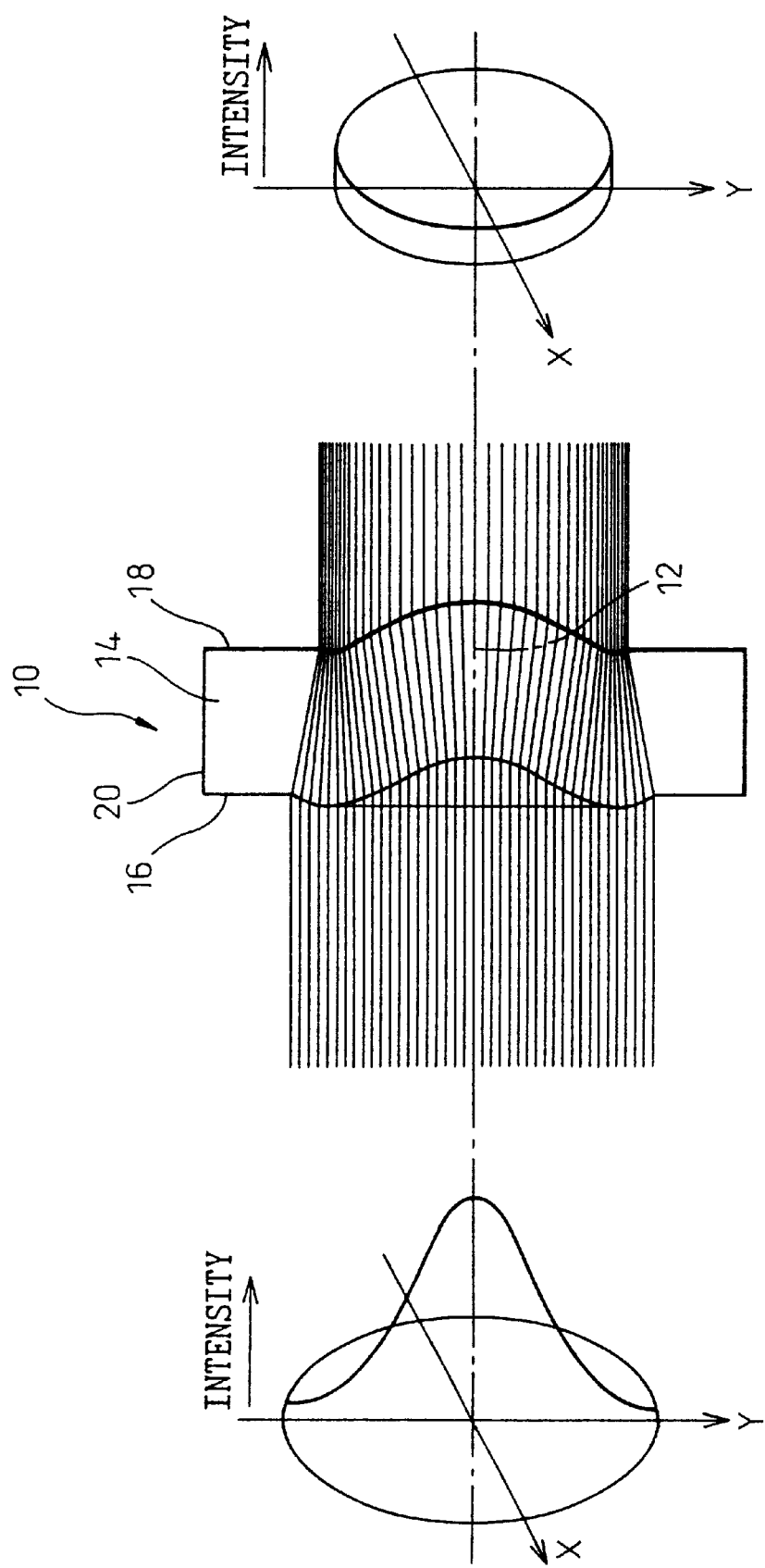

LIGHT INTENSITY CONVERTER

BACKGROUND OF THE INVENTION

1. Field of the Invention

The present invention relates to a light intensity converter capable of converting the light intensity distribution of an incident light and emitting the converted light. The present invention also relates to an optical device and an optical disk drive using such a light intensity converter.

The present invention provides an optical element in which a laser beam having a light intensity distribution in the direction perpendicular to the optical axis is converted into a laser beam having a uniform wavefront intensity in a given aperture and the transmission wavefront aberration (RMS) is reduced to 0.07 $\lambda$ or less, thereby making is possible to improve the beam diameter and the beam shape in a laser beam processing system, a microscope optical system and an information recording medium optical system, used in various fields.

2. Description of the Related Art

The conventional method of changing the beam intensity distribution uses a diffraction grating with the diffraction efficiency changed from one position to another, a concentration filter having a transmission distribution inversely proportional to the intensity distribution, and a slit for taking out an area of small beam intensity distribution. Various other methods have also been proposed, including a method for superposing laser beams by a half mirror or the like, a method for generating a secondary light source by a diffraction grating or the like, a method for replacing inner and outer intensity distributions with each other by refraction through a prism or the like, and a method for utilizing a blooming of a zoom lens.

Japanese Unexamined Patent Publications No. 3-75612 and No. 3-92815, for example, disclose a method for converting an incident light having a Gaussian intensity distribution into an exiting light having a substantially uniform intensity distribution, using first and second lens groups lenses with each group including two lenses.

The above-mentioned methods using the diffraction grating, the concentration filter or the slit cannot basically attain the light utilization rate of 100% and are always accompanied by an optical loss. Also, the method of superposing laser beams and the method of generating a secondary light source cause a wavefront aberration and cannot reduce the laser beam to the limit of diffraction.

In the method using refraction, on the other hand, the light paths are crossed on inner and outer sides, so the light paths are different and a wavefront aberration is developed. Also, the method using the zoom lens attains a uniform intensity at the sacrifice of an increased wavefront aberration. The conventional technologies described in JP-A-3-75612 and JP-A-3-92815 use at least four lenses while retaining the zooming function.

In the prior art, therefore, emphasis is placed on securing a predetermined intensity distribution of a beam spot rather than reducing the beam spot size. The above-mentioned methods could be used for a laser machining equipment or the like for which a spot size of about several $\mu$m is allowable and the light amount loss poses no problem. The above-mentioned methods, however, cannot be used for an optical system including a low-output light source for reading data from an information recording medium because of the wavefront aberration and the light utilization rate.

SUMMARY OF THE INVENTION

The object of the present invention is to provide a light intensity converter having a small thickness and a simple configuration capable of emerging a light beam while changing the light intensity distribution, and an optical device and an optical disk drive using such a light intensity converter.

A light intensity converter according to the present invention comprises a body having a center axis, a first curved surface extending transversely to the center axis, a second curved surface extending transversely to the center axis, and an outer peripheral surface extending between the first curved surface and the second curved surface, and wherein said body is constructed such that a light having first light intensity distribution is made incident to said body at said first curved surface, the incident light diverges in a first area in said body and converges in a second area in the body, by refraction, when the light enters said body from said first curved surface, and the light emerges from said body at said second curved surface, the emerging light having a second light intensity distribution different from said first light intensity distribution.

This light intensity converter can be formed as a thin body and can positively convert the light intensity distribution of the incident light into a uniform light intensity distribution.

Preferably, the incident light entering from the first curved surface diverges in the central area around the center axis of the body and converges at the peripheral area in the body.

Preferably, the amount of inclination of the outermost peripheral portion of the first and second curved surfaces and the amount of inclination at a point where the inclination changes from ascendance to descendance or from descendance to ascendance have opposite signs and substantially the same absolute value.

Preferably, the thickness of the body is such that the RMS value of wavefront aberration of the exiting light with respect to the incident light is not more than 0.07 $\lambda$.

Preferably, the shape of the first and second curved surfaces of said body is determined in the following manner, where a light ray is made incident to the body at an incident point (A) with a first distance ($r_1$) from the optical axis and emerges from body at an exit point (B), with the second distance ($r_2$) from the optical axis:

the second distance ($r_2$) is determined by dividing the amount $P_1$ of the light existing in the range from the optical axis to said first distance ($r_1$) by the intensity I which is obtained by dividing the total amount of the incident light by a predetermined area of the emerging light;

the linear distance between the incident point (A) and the exit point (B) is hypothetically given thereby to determine the direction of deflection of the light ray passing through the incident point (A);

the inclinations of the planes passing through the incident point (A) and the exit point (B) are determined according to the law of refraction;

the inclinations of the planes passing through the incident point (A) and the exit point (B) thus determined are integrated by the radial distance from said center axis thereby to determine the curved surfaces on the incident and exit sides;

the curved surface on the exit side is determined from the curved surface on the incident side, the direction of deflection at each arbitrary distance ($r_1$) and the hypothetically-determined distance (L);

the distance (L) associated with each arbitrary distance ($r_1$) is changed in such a manner that the curved surface on the exit side determined by integration coincides with the curved surface on the exit side determined from the incident surface; and the inclinations of the incident and exit surfaces are determined repeatedly so as to converge the distance (L).

According to the present invention, there is further provided an optical device and an optical disk drive, using the above-mentioned light intensity converter.

BRIEF DESCRIPTION OF THE DRAWINGS

The present invention will become more apparent from the following description of the preferred embodiments, with reference to the accompanying drawings, in which:

FIG. 5 is a view illustrating a light intensity converter according to the second embodiment of the invention;

FIG. 6 is a view illustrating a light intensity converter according to the third embodiment of the invention;

FIG. 7 is a view illustrating the relation between the radius and the surface inclination of the light intensity converter;

FIG. 9 is a view illustrating a light intensity converter according to the fifth embodiment of the invention;

DESCRIPTION OF THE PREFERRED EMBODIMENTS

Figure 1:
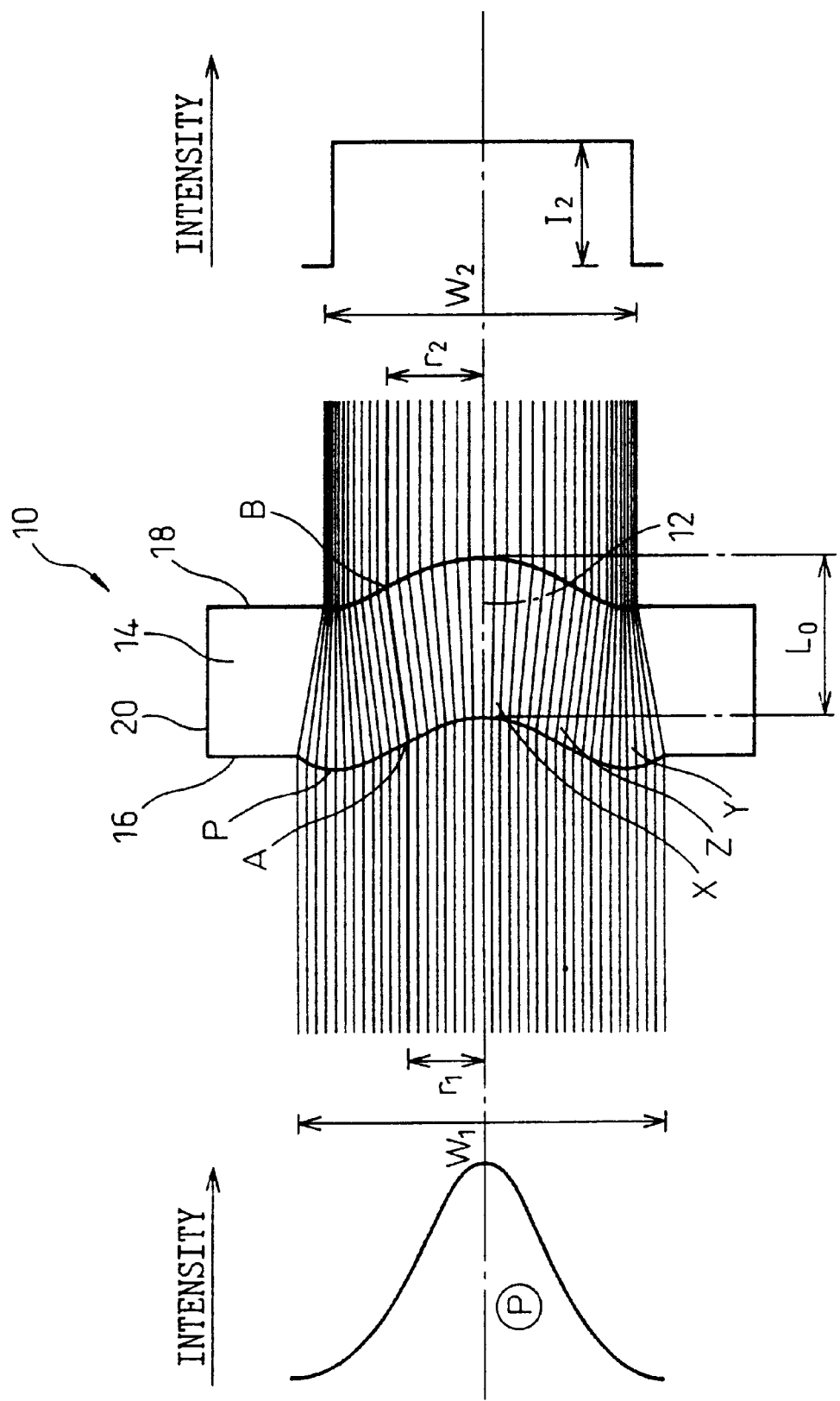
FIG. 1 is a view illustrating a light intensity converter according to the first embodiment of the present invention.
Figure 2:
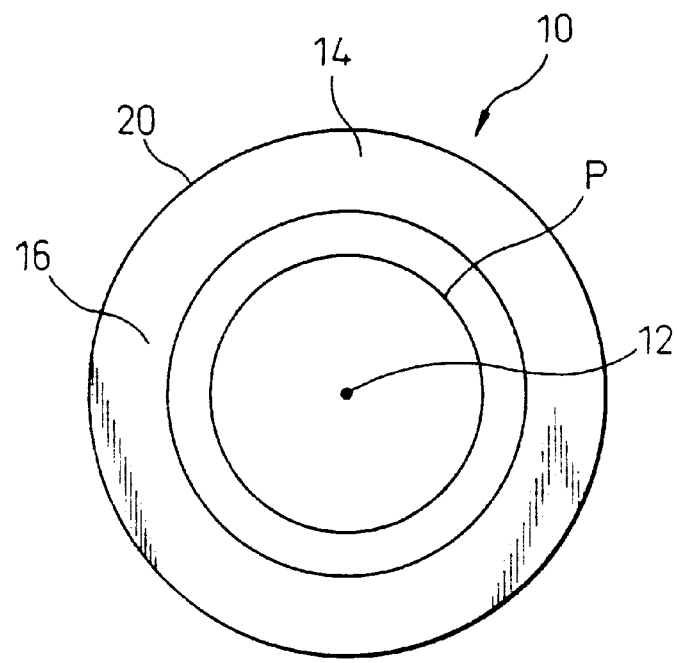
FIG. 2 is a front view of the light intensity converter of FIG. 1, viewed from the light incidence side thereof.

FIGS. 1 and 2 are views illustrating a light intensity converter or a light intensity converting element 10 according to the first embodiment of the present invention. FIG. 1 is a cross-sectional view of the light intensity converter 10, and FIG. 2 is a front view of the light intensity converter 10. Further, FIG. 1 shows a multiplicity of optical paths extending through the light intensity converter 10 for light rays. As seen from the optical paths of light rays, the light intensity converter 10 converts parallel light rays having a Gaussian light intensity distribution into parallel light rays having a uniform intensity distribution.

Figure 3:
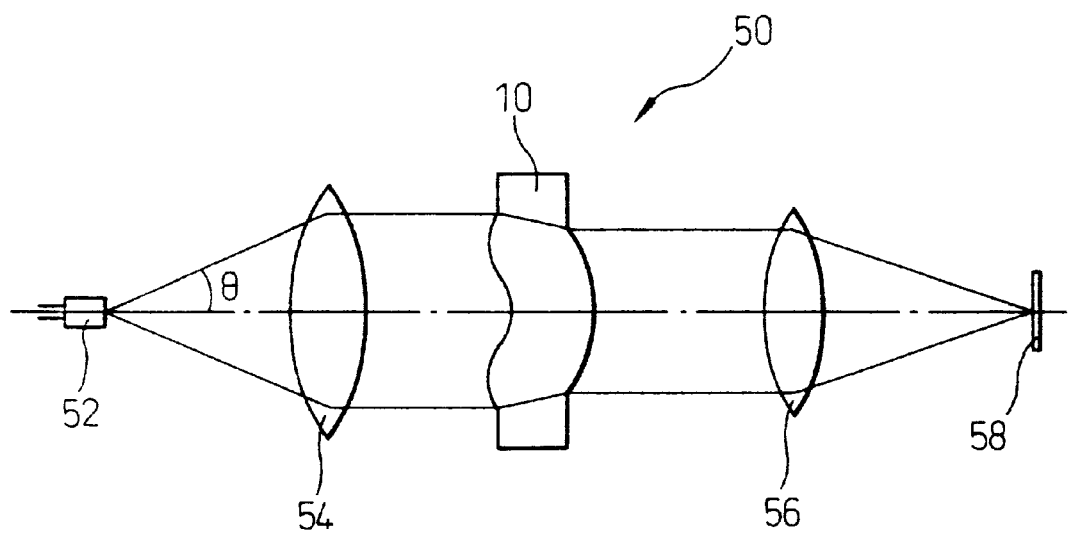
FIG. 3 is a view illustrating an optical device including the light intensity converter.

FIG. 3 shows an optical device 50 including the light intensity converter 10 of FIGS. 1 and 2. This optical device 50 includes a laser light source 52, a collimating lens 54, the light intensity converter 10 and an object lens 56. The laser light source 52 emits a diverged light having a typical Gaussian light intensity distribution. The laser beam emitted from the laser light source 52 is converted into parallel Light rays having the Gaussian light intensity distribution by the collimating lens 54. The parallel light rays having the Gaussian light intensity distribution are converted into parallel light rays having a uniform light intensity distribution by the light intensity converter 10, and condensed by the object lens 56 to impinge on an object 58.

An example of the optical device 50 is a laser machining equipment capable of cutting the object 58 by a laser beam. According to this invention, the light intensity converter 10 can convert parallel light rays having the Gaussian light intensity distribution into parallel light rays having a uniform intensity distribution, which can be condensed to a smaller light spot by the object lens 56. Consequently, the optical device 50 can be used for an application requiring a laser beam more condensed than that in the laser machining equipment, and preferably, the optical device 50 can be used in an optical disk drive or a microscope system.

In FIGS. 1 and 2, the light intensity converter 10 includes a transparent body 14 having a center axis 12. The body 14 is made of a transparent material (such as glass) having an isotropic refractive index. The body 14 includes a first curved surface 16 extending transversely of the center axis 12, a second curved surface 18 similarly extending transversely of the center axis 12 on the opposite side of the body 14 from the first curved surface 16, and a cylindrical outer peripheral surface 20 extending between the first curved surface 16 and the second curved surface 18. The light intensity converter 10 is formed in such a manner that the parallel light rays having the Gaussian light intensity distribution are made incident to the body 14 at the first curved surface 16. The light passing through the body 14 emerges from the second curved surface 18.

The light intensity converter 10 is so configured that the incident light made incident to the body at the first curved surface 16 diverges in a certain area in the body 1, and converges in another area in the body 14, and then emerges from the second curved surface 18 as a light having a light intensity distribution different from that of the incident light. The optical paths of the light rays are arranged not to cross each other.

More specifically, the optical paths of the light rays passing through the light intensity converter 10 extend in parallel with each other in the area Z. In the central area X on the inner side of the area Z, the light rays diverge, while the light rays converge in the peripheral area Y outside the area Z. As a result, the light rays having higher intensity at the central portion in the Gaussian light intensity distribution, shown at the left end of FIG. 1, diverge as they pass through the light intensity converter 10, and the intensity thereof is reduced when emerging from the light intensity converter 10. On the contrary, the light rays having low intensity at the peripheral portion converge and the intensity is increased as they pass through the light intensity converter 10. In this way, the incident light having the Gaussian light intensity distribution is converted by the light intensity converter 10 into an emerging light having a uniform light intensity distribution as a whole.

The body 14 is formed in the rotationally symmetrical shape about the center axis 12. For example, the first curved surface 16 of the body 14 has an annular protrusion P. This annular protrusion P is located on a circle formed about the center axis. Concentric depressions are located inside and outside the annular protrusion P of the first curved surface 16. The second curved surface 18 has a shape roughly similar to the first curved surface 16, and is depressed at the portion thereof substantially corresponding to the protrusion of the first curved surface 16. However, the second curved surface 18 does not exactly correspond to the first curved surface 16.

In this embodiment, the light intensity converter 10 is adapted to convert the incident light rays having the Gaussian light intensity distribution and an incident aperture $w_1$ into emerging light rays having a uniform light intensity distribution and an exit aperture $w_2$. There is the relationship that the incident aperture $w_1$ is larger than the exit aperture $w_2$ ($w_1 > w_2$). In the embodiment of FIG. 1, $w_1$ is 4.0 mm, $w_2$ is 3.4 mm, and $L_0$ described later is 1.5 mm.

Now, a method of fabricating the light intensity converter 10 will be described with reference to FIGS. 1 to 4. Here, P is the total light amount of the incident light having the Gaussian light intensity distribution and the intensity of the emerging light having a uniform light intensity distribution. Since the incident light amount is identical to the emerging light amount, the intensity 12 of the emerging light is determined by equation (1).

$$I_2 = P/w_2 \tag{1}$$

Also, $r_1$ is the distance (radius) from the center axis 12 to an arbitrary incident point A, B is the point from which the light ray passing through the incident point A emerges, and $r_2$ is the distance (radius) from the center axis 12 to the exit point B. Also, L is the length of the optical path extending through the light intensity converter 10, i.e. the distance from the incident point A to the exit point B (hereinafter referred to as the light path length). The light path length along the center axis 12 is given as $L_0$.

Assuming that $P_1$ is the total light amount within the portion from the center to the incident point A (the region in the circle with radius $r_1$), $r_2$ is determined from equation (2) below, where $I_2$ is determined from the equation (1) above.

$$r_2 = P_1/I_2 \tag{2}$$

Here, considering that the semiconductor laser rays having the diverging angle θ (half of full angle) are converted into parallel light rays by the collimating lens having a focal length of f, the intensity $I_1$ of the incident light within the range of the radius $r_1$ is determined by equation (3).

$$I = \exp(-C \times [r_1]^2) \tag{3}$$

where $$C = \ln(2)/(f \times \sin(\theta/2)^2)$$

Using the equation (3), the total light amount P and the light amount $P_1$ within the range of $r_1$ are determined from the following equations (4) and (5).

$$P_1 = (\pi/C) \times (1 - \exp(-C \times [r_1]^2)) \tag{4}$$

$$P = (\pi/C) \times (1 - \exp(-C \times [w_1/2]^2)) \tag{5}$$

The light intensity $I_2$ of the equation (1) is expressed by the equation (6) below.

$$I_2 = P/(\pi \times (w_2/2)^2) \tag{6}$$

Thus, the equation (2) can be expressed by the following equation (7).

$$r_2 = \sqrt{\frac{P_1}{\pi \times I_2}} \tag{7}$$

Figure 4:
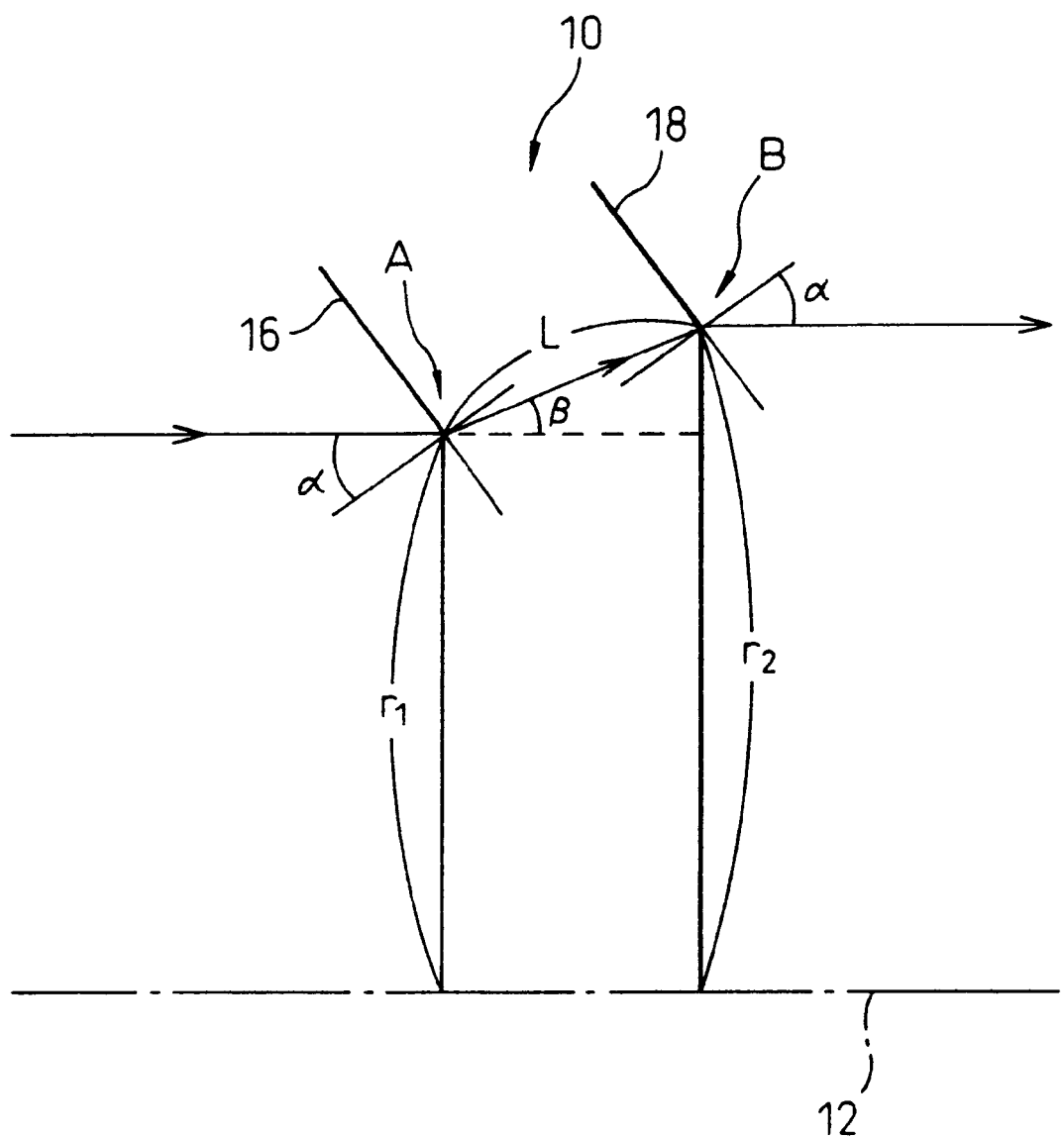
FIG. 4 is a view explaining a method of fabricating the light intensity converter of FIGS. 1 and 2.

As shown in FIG. 4, since both the incident light and the emerging light are parallel light rays, the angle α of the light made incident to the first curved surface 16 is equal to the angle α of the emerging light emerging from the second curved surface 18. Assume that β is the deflection angle of the incident light, and n the refractive index of the body 14 of the light intensity converter 10. From Snell's law, the following equations (8) and (9) are obtained.

$$\tan(\alpha) = (n \times \sin(\beta))/(n \times \cos(\beta) - 1) \tag{8}$$

$$\sin(\beta) = (r_2 - r_1)/L \tag{9}$$

In the equation (8), tan α represents the amount of inclination of the first and second curved surfaces 16, 18. In order to calculate tan α of the equation (8), β calculated in the equation (9) is substituted into the equation (8). Equation (9) is calculated by substituting the relationship between the radius $r_2$ and the radius $r_1$ of the equation (7) and a hypothetical value of the optical path length L. Once the amounts of inclinations of the first and second curved surfaces 16, 18 have been calculated, the shape of a curved surface is obtained from successive inclinations. To this end, the radius $r_2$ is increased from 0 to respective values, so that a continuously curved shape can be obtained. However, the use of the following approximation method is more advantageous.

Generally, the shape of the first and second curved surfaces 16, 18 of the light intensity converter 10 is expressed by an aspheric polynomial shown in the following equation (10).

$$Z = \frac{X^2/R}{1 + \sqrt{1 - (1+K) \times (X/R)^2}} + AX^4 + BX^6 + CX^8 + DX^{10} + \ldots \tag{10}$$

where X is the radial distance, Z the position of the incident surface, R the radius of curvature at the center and K the parabolic constant. This equation (10) is differentiated by the radius to obtain the inclination with respect to the radius.

In view of this, the shape of the first curved surface 16 on the incident side is determined in such a manner that the numerical data of tan β for the radial values r, for each light ray up to the aperture radius of $w_2/2$ of the light intensity converter 10 is calculated from equation (9) and approximated from the differential equation (10). This polynomial is integrated by the radius $r_1$ thereby to obtain an equation representing the surface shape.

There are two methods for determining the shape of the second curved surface 18 on the emerging side. The first method is to integrate the shape of the curved surface by $r_2$ as in the calculation of the shape of the first curved surface 16 on the incident side. In this case, the calculation is similar to the above-mentioned one, and therefore will not be described in detail.

The second method consists of calculating the shape of the second curved surface 18 on the emerging side from the position of the curved surface on the incident side, the direction of deflection β and the optical path length L. This method can be used to calculate the position of the curved surface on the emerging side from the following equation (11), assuming that z1 is a position in the direction of the center axis 12 for the radius $r_1$ on the incident side and $z_2$ is a position in the direction of the center axis 12 for the radius $r_2$ on exit side.

$$Z_2 = (r_2 - r_1)/\tan(\beta) + Z_1 \tag{11}$$

Using the thus calculated value $Z_2$, Z is approximated by the equation (10). The shape of the second curved surface 18 on the emerging side determined by integrating the inclination generally does not, in general, coincide with the shape of the second curved surface 18 on the emerging side determined by the calculation of the equation (11). This is because the optical path length L' calculated from the equation determined by integrating the inclination is different from the assumed optical path length L. The optical path lengths L' and L should originally coincide with each other. In view of this, the optical path length L' in the light intensity converter 10 is calculated from the equations on the incident and exit sides determined by integrating the inclination.

$$L' = \sqrt{(r_2 - r_1)^2 + (Z_2 - Z_1)^2} \qquad (12)$$

The optical length L' calculated for each radius $r_1$ is re-defined as the new optical path length L for each radius $r_1$, and the calculation of equations (8) to (12) is repeated until the difference (Δ=L−L') converges to 0 for each radius $r_1$.

In this way, the desired shape of the light intensity converter 10 can be determined. However, the light intensity converter 10 calculated in this way cannot always be applied to all the microoptic systems. This is because the aberration occurs between the end portion and the center of the optical axis depending on the travelling light rays as in the flat convex lens. Therefore, the RMS (wavefront aberration) of the light intensity converter 10 is calculated, and if the RMS value is not more than 0.07 λ, it can be considered that an ideal optical element is determined meeting Rayleigh's limit value. The RMS value is a mean value of the optical path difference for all the incident light rays within an area.

For the RMS value to be reduced, the optical path lengths of the light rays passing through each radius of the light intensity converter 10 are required to be equal to each other. According to this embodiment, parallel light rays are converted into parallel light rays, and therefore the smaller the difference in the optical path length, the smaller the deflection of the light rays due to refraction. The deflection can be reduced by reducing the incident angle of the incident light rays. The RMS value can be reduced by appropriately selecting the requirements of the incident aperture diameter and the exit aperture diameter associated with a minimum absolute value of inclination within the effective intensity conversion area of the light intensity converter 10 or by increasing the thickness of the light intensity converter 10. For the same thickness, the smaller the absolute value of inclination, the RMS value is smaller.

For some approximation equations, however, -the approximation for the peripheral portions may be unsatisfactory. The RMS value is a mean value within an area, and as the weight of the peripheral portions becomes larger, so the RMS value is deteriorated even by a small difference in the light ray path length. In view of this, the RMS value can be reduced by masking the peripheral portions. In the case of the light intensity converter 10 of FIG. 1, the shape of the curved surface was approximated by the polynomial of ten terms, with the result that the maximum wavefront aberration was 0.044 λ and the RMS value 0.012 λ.

In the embodiment of FIG. 1, the thickness $L_0$ of the central portion of the light intensity converter 10 is 1.5 mm, the incident aperture diameter w, 4 mm and the exit aperture diameter $w_2$ 3.4 mm. With a similar technique, the relationship between incident aperture diameter $w_1$ and exit aperture diameter $w_2$ can be changed, as shown in FIGS. 5 and 6.

FIG. 5 shows an example in which the incident aperture diameter $w_1$ and the exit aperture diameter $w_2$ are 4 mm and equal to each other. The thickness $L_0$ is 1.5 mm. FIG. 6 shows a case in which the incident aperture diameter $w_1$ is 4 mm and the exit aperture diameter $w_2$ is 5 mm. The thickness $L_0$ is 4 mm. Also in FIGS. 5 and 6, the light intensity converter 10 converts the parallel light rays having the Gaussian light intensity distribution into parallel light rays having a uniform light intensity distribution.

The thickness of the light intensity converters 10 shown in FIGS. 1 and 5 is 1.5 mm, while the thickness of the light intensity converter 10 shown in FIG. 6 is 4 mm. The thickness is increased in FIG. 6 in order to prevent part of the light rays in the converter from exceeding the critical angle which may be the case when the thickness is 1.5 mm.

FIG. 7 is a graph illustrating the relationship between the radius $r_2$ and the inclination of the curved surfaces. The solid curve H represents the case in which the incident aperture diameter is larger than the exit aperture diameter, and the dashed curve I represents the case in which the incident aperture diameter is smaller than the exit aperture diameter. The incident aperture diameter is 4 mm in both the cases, while the exit aperture diameter is 3.4 mm for the solid curve H and 5 mm for the dashed curve I. This graph shows that the absolute value of the inclination can be reduced for the solid curve H representing the case in which the exit aperture is smaller than the incident aperture. This can be said also of other aperture diameters, and the absolute value of the inclination can be reduced when the exit aperture is smaller than the incident aperture. The absolute value of the inclination thus can be minimized when the absolute value of the inclination at the bottom position of the solid curve H of FIG. 7 (position (1) at which the inclination turns from descending to ascending) equals the absolute value of the inclination at the outermost peripheral portion (position (2)).

Figure 8A:
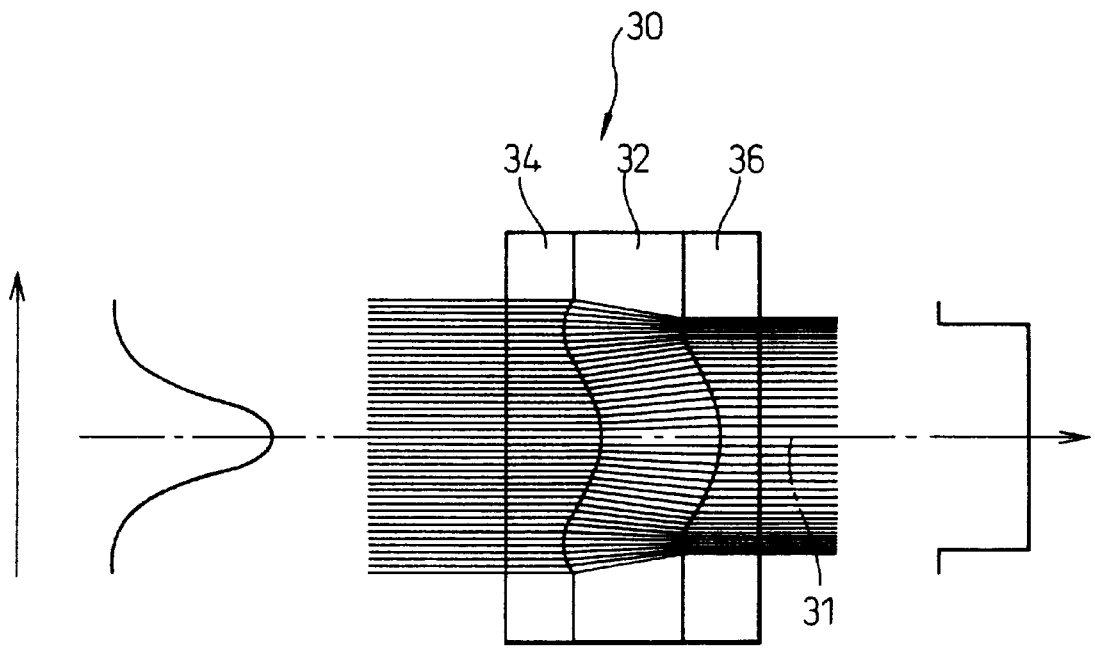
FIGS. 8A and 8B are views illustrating a light intensity converter according to the fourth embodiment of the invention.
Figure 8B:
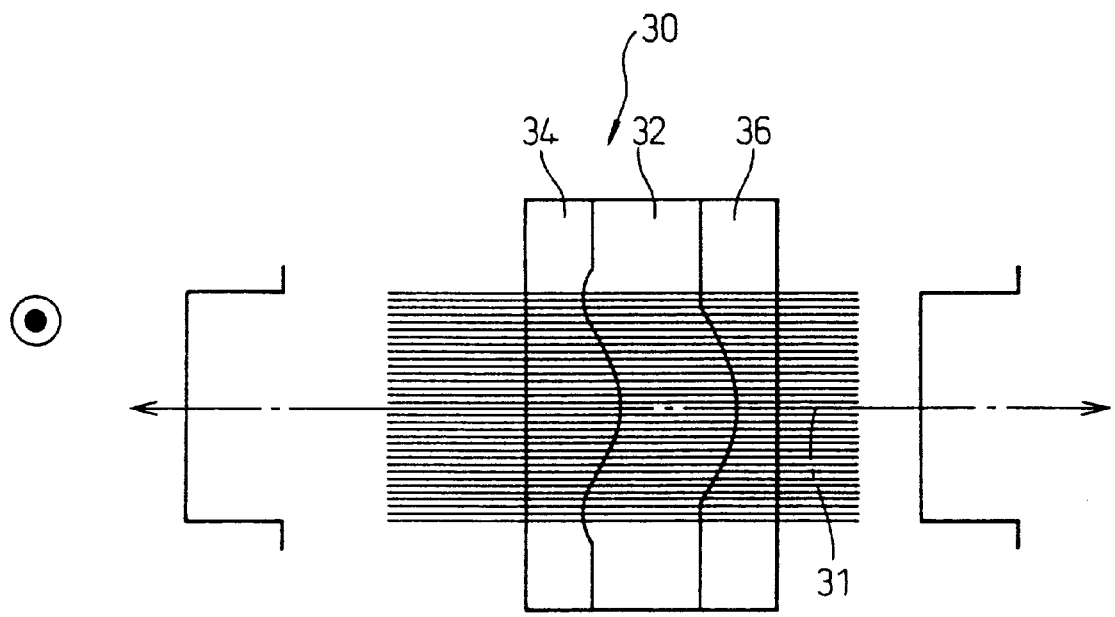

FIGS. 8A and 8B show a light intensity converter 30 according to another embodiment. The light intensity converter 30 comprises a birefringent plate 32 having different refractive indixes ($n_0$, $n_1$) along two axes perpendicular to a center axis 31, and plates 34, 36 for sandwiching the birefringent plate 32 and having the same refractive index no as one of the refractive indixes of the birefringent plate 32. The light intensity converter 30 has a structure with vertical incident and exit surfaces. The birefringent plate 32, which is formed in a shape similar to the light intensity converter 10 of the preceding embodiment, operates in such a manner that when a polarized light beam coincident with one of the axes is made incident, the light intensity conversion is effected like the light intensity converter 10, as shown in FIG. 8A, while when a polarized light beam coincident with the other axis is made incident, the light intensity conversion is not substantially effected as shown in FIG. 8B. The surfaces of the plates 34, 36 are flat to facilitate the handling of the light intensity converter 30.

The light intensity converter 30 shown in FIGS. 8A and 8B is especially effectively applicable to an optical system (for example, an optical disk drive) for an information recording apparatus or the like. Specifically, in the case where a polarized light beam is made incident in one direction, the light conversion effect is so high that the light rays directed to a medium can be highly condensed, and the light rays reflected from the medium are not converted. The information on the medium thus can be produced as it is.

Although the foregoing description fails to refer to the dimension, the light intensity converter according to the present invention is of course effectively applicable to the incident light having a two-dimensional light intensity distribution as shown in FIG. 9 as well as one-dimensional light intensity distribution. Also, apart from the incidence and exit of parallel light rays described above, the present invention is applicable with equal effect to the incidence and exit of divergent light rays.

Figure 10:
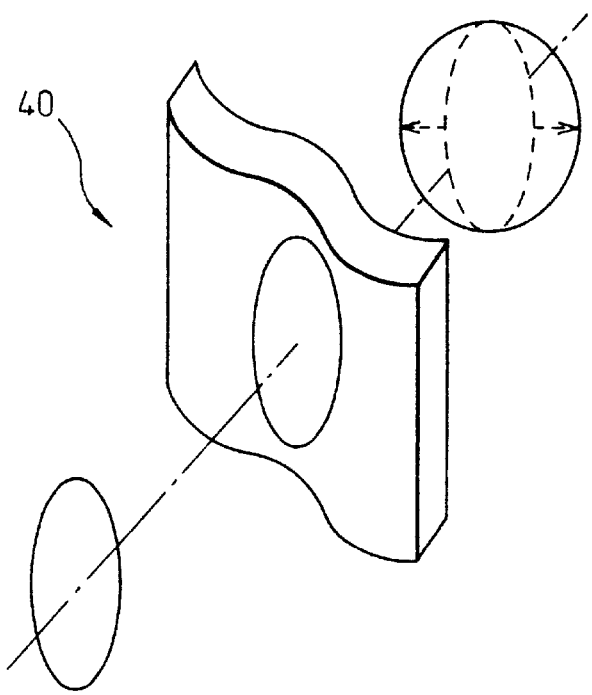
FIG. 10 is a view illustrating a light intensity converter according to the sixth embodiment of the invention.

FIG. 10 shows a light intensity converter 40 according to still another embodiment. The intensity distribution of a semiconductor laser is elliptical in shape. In order to change the elliptical light intensity distribution to the light intensity distribution of an arbitrary shape, the conventional method uses a complete round correcting prism to which light rays are made incident diagonally. The use of the light intensity converter as shown in FIG. 10 in place of the prism makes it possible to convert the elliptical light intensity distribution to a complete-round light intensity distribution. Thus, the unnecessary volume for diagonal incidence to the prism is reduced for a reduced weight, thickness and length of the optical system.

Figure 11:
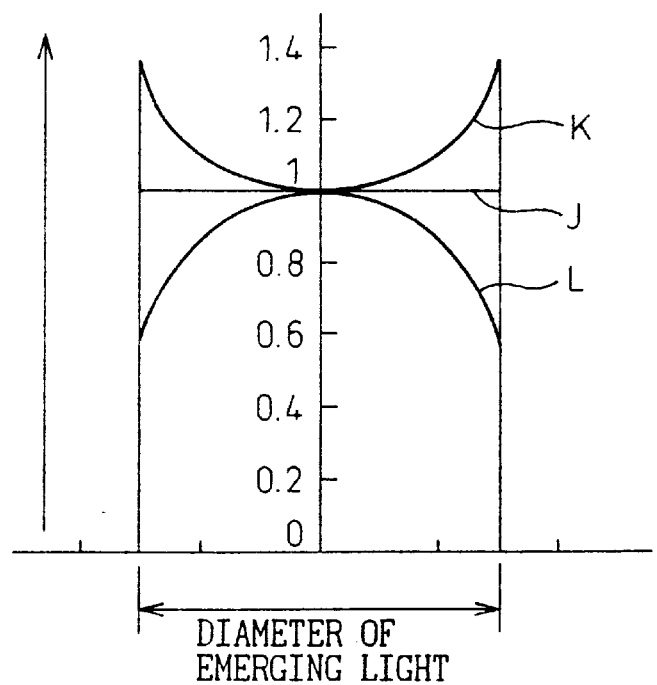
FIG. 11 is a view illustrating the light intensity distribution of the emerging light derived from an incident light having a light intensity distribution different from a predetermined one and entering the light intensity converter.
Figure 12:
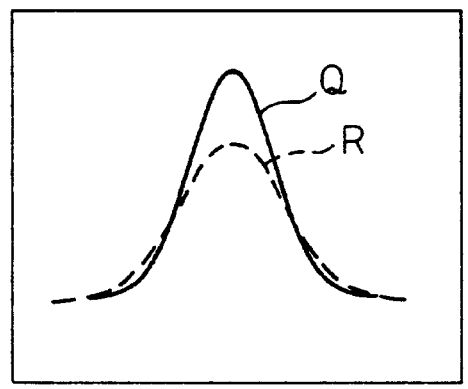
FIG. 12 is a view illustrating the definition of the wide light intensity distribution used in FIG. 11.

FIG. 11 shows the intensity distribution of the emerging light when the light having the light intensity distribution other than the designed one is made incident to the light intensity converter 10. A wide light intensity distribution and a narrow light intensity distribution are defined by curves R and Q, respectively, in FIG. 12. The solid curve Q has a higher peak and lower tails than the dotted curve R. In this case, the dotted curve R is assumed to represent a wider light intensity distribution than the solid curve Q.

The straight line J in FIG. 11 shows the intensity distribution of the emerging light when the incident light having the designed light intensity distribution is made incident to the light intensity converter 10. The curve K shows the intensity distribution of the emerging light when the incident light having a wider light intensity distribution than the designer one is made incident to the light intensity converter 10. In this case, the light intensity distribution is cup-shaped with the intensity higher at the peripheral portion than at the central portion. The curve L shows the intensity distribution of the emerging light when the incident light having a narrower light intensity distribution than the designed one is made incident to the light intensity converter 10. In this case, the light intensity distribution is dome-shaped with the intensity high at the central portion and low at the peripheral portion.

In the case where the incident light having a light intensity distribution as shown in FIG. 11 is condensed, it is known that the beam can be condensed more satisfactorily in the order of the cup-shaped, the uniform type and Gaussian intensity distributions. When the light intensity converter 10 is used for converting the light emitting from a light source such as a semiconductor laser with wide angle and variations into a uniform intensity, the light intensity converter 10 is set to adapt for the light intensity distribution corresponding to the narrowest spreading angle of the semiconductor laser, so that the light intensity distribution of the emerging light from the light intensity converter 10 is uniform even at minimum and normally cup-shaped. Then, the beam convergence is improved. Also, this optical system eliminates the need of a complete-round correcting prism and thus the optical device is improved.

Also, in an optical system including an optical part movable in the direction perpendicular to the center axis and an immovable optical part, the light intensity converter is located on the side of the immovable optical part and has an exit aperture wider than the combination of the aperture and the moving stroke of the movable optical part. In this way, even when the movable part is moved, the light intensity converter can supply parallel light rays having the converted light intensity through the movable part.

Figure 13:
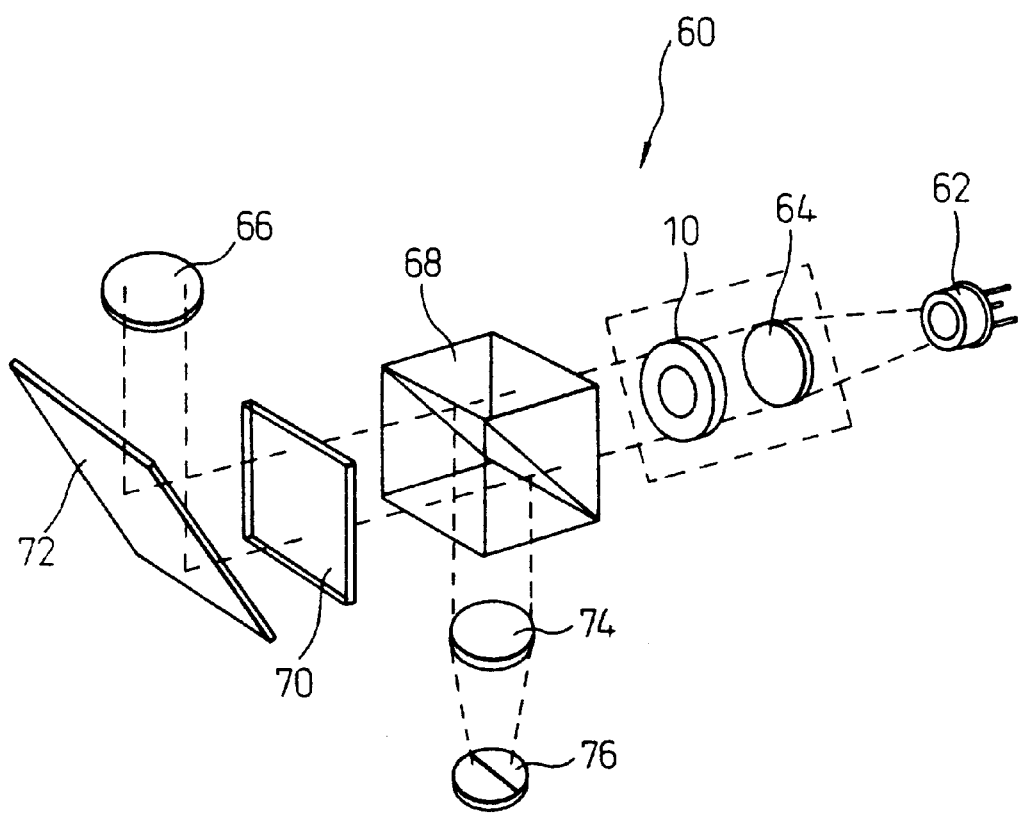
FIG. 13 is a view illustrating an optical disk drive including a light intensity converter.

FIG. 13 shows an example of an optical disk drive 60 including the light intensity converter 10. The optical disk drive 60, like the optical device 50 of FIG. 3, includes a laser light source 62, a collimating lens 64, a light intensity converter 10 and an object lens 66. The optical disk drive 60 further includes a beam splitter 68, a ¼ wave plate 70, a tracking mirror 72, a condenser lens 74 and a photo diode 76.

The light intensity converter 10 is interposed between the collimating lens 64 and the beam splitter 68. The collimating lens 64 and the light intensity converter 10 are mounted to a common frame and integrated with each other. As a result, even in the case where other lenses (such as the object lens 66) are moved, focussing of the light can be compensated for irrespective of the deviation of the moving lens from the optical axis.

The present invention further comprises the following features.

The first and second curved surfaces are shaped in a rotationally symmetrical shape. The first and second curved surfaces are capable of converting an elliptical light intensity distribution into a circular light intensity distribution. The body is made of a birefringent material having two optical axes with respect to the center axis. The body is sandwiched by a material having the same refractive index as that of one of the optical axes of the birefringent material and has a surface processed in the direction perpendicular to the optical axis.

The wavefront aberration is reduced by masking the edge of the light intensity converter. An incident light having a wider light intensity distribution than a predetermined light intensity distribution is caused to enter so that a light emerges which is higher in intensity at the outermost edge than at the central portion. In an optical system including an optical part movable in the direction perpendicular to the center axis and an immovable optical part, the light intensity converter is located on the side of the immovable part and has an exit aperture wider than the combined value of the aperture diameter and the moving distance of the movable part. The light intensity converter is formed of a birefringent material having two optical axes with respect to the center axis, and a material sandwiching the birefringent material and having the same refractive index as one of the optical axes of the birefringent material. The light intensity converter is arranged before the collimating lens and the intensity distribution is changed by switching the direction of deflection thereby to change the beam diameter and the intensity distribution. The optical device comprises a light source, a collimating lens and a light intensity converter, wherein the collimating lens and the light intensity converter are integrated with each other.

As described above, according to this invention, an optical device using a simple light intensity converter has no light loss, is resistant to a high output light, is low in aberration and can arbitrarily control the light intensity distribution. The performance can therefore be easily improved. Also, the light intensity converter using refraction is low in loss. Further, the light intensity distribution of the exiting light and the shape of the exit aperture can be determined freely, thereby making it possible to reduce the number of parts of the optical device.

What is claimed is:

1. A light intensity converter comprising:
   a body including a first curved surface extending transversely of a center axis, a second curved surface extending transversely of said center axis, and an outer peripheral surface extending between said first curved surface and said second curved surface; and
   wherein said body is constructed such that a light having first light intensity distribution is made incident to said body at said first curved surface, the incident light diverges in a first area in said body and converges in a second area in said body, by refraction, when the light enters said body from said first curved surface, and the light emerges from said body at said second curved surface, the emerging light having a second light intensity distribution different from said first light intensity distribution, wherein said first light intensity distribution is a Gaussian distribution, and said second light intensity distribution is a uniform distribution.

2. A light intensity converter according to claim 1, characterized in that the incident light entering said body at said first curved surface diverges in the central area around said center axis in said body and converges in the peripheral area in said body.

3. A light intensity converter according to claim 1, characterized in that, in said first and second curved surfaces, the amount of inclination in the outermost peripheral portion and the amount of inclination at a point where the inclination changes from ascending to descending or descending to ascending have opposite signs and substantially the same absolute values.

4. A light intensity converter according to claim 1, characterized in that said body has such a thickness that the RMS value of the wavefront aberration of the emerging light with respect to the incident light is not more than 0.07 $\lambda$.

5. A light intensity converter according to claim 1, characterized in that, regarding the light passing through a minute area of said body, the incident angle is substantially the same as the emerging angle.

6. A light intensity converter according to claim 1, characterized in that the shapes of the first and second curved surfaces of said body are determined in the following manner, where a light ray is made incident to the body at an incident point (A) with a first distance ($r_1$) from the optical axis and emerges from body at an exit point (B), with the second distance ($r_2$) from the optical axis:

the second distance ($r_2$) is determined by dividing the amount $P_1$ of the light existing in the range from the optical axis to said first distance ($r_1$) by the intensity I which is obtained by dividing the total amount of the incident light by a predetermined area of the emerging light;

the linear distance between the incident point (A) and the exit point (B) is hypothetically given thereby to determine the direction of deflection of the light ray passing through the incident point (A);

the inclinations of the planes passing through the incident point (A) and the exit point (B) are determined according to the law of refraction;

the inclinations of the planes passing through the incident point (A) and the exit point (B) thus determined are integrated by the radial distance from said center axis thereby to determine the curved surfaces on the incident and exit sides;

the curved surface on the exit side is determined from the curved surface on the incident side, the direction of deflection at each arbitrary distance ($r_1$) and the hypothetically-determined distance (L);

the distance (L) associated with each arbitrary distance ($r_1$) is changed in such a manner that the curved surface on the exit side determined by integration coincides with the curved surface on the exit side determined from the incident surface; and the inclinations of the incident and exit surfaces are determined repeatedly so as to converge the distance (L).

7. An optical disk drive comprising a light source, a collimating lens, a light intensity converter and an object lens;

said light intensity converter including a body having a center axis, a first curved surface extending transversely of said center axis, a second curved axis extending transversely of said center axis, and an outer peripheral surface extending between said first curved surface and said second curved surface, and wherein said body is constructed such that a light having first light intensity distribution is made incident to said body at said first curved surface, the incident light diverges in a first area in said body and converges in a second area in said body, by refraction when the light enters said body from said first curved surface, and the light emerges from said body at said second curved surface, the emerging light having a second light intensity distribution different from said first light intensity distribution; and said collimating lens and said light intensity converter are integrated with each other to thereby compensate for focussing of the light irrespective of the deviation of the movable object lens from the optical axis.

8. An optical disk drive comprising a light source, a collimating lens, a light intensity converter, a beam splitter and an object lens, said light intensity converter including a body having a center axis, a first curved surface extending transversely of said center axis, a second curved axis extending transversely of said center axis, and an outer peripheral surface extending between said first curved surface and second curved surface, and wherein said body is constructed such that a light having first light intensity distribution is made incident to said body at said first curved surface, the incident light diverges in a first area in said body and converges in a second area in said body, by refraction when the light enters said body from said first curved surface, and the light emerges from said body at said second curved surface, the emerging light having a second light intensity distribution different from said first light intensity distribution; and said light intensity converter being arranged between said beam splitter and said collimating lens.

9. A light intensity converter according to claim 1, characterized in that an incident aperture (w1) of the incident light is greater than an exit aperture (w2) of the emerging light.

10. A light intensity converter according to claim 1, characterized in that said first curved surface has an annular protrusion (P) about the center axis, and concentric depressions inside and outside the annular protrusion, so that an incident aperture (w1) of the incident light is greater than an exit aperture (w2) of the emerging light.

11. An optical device comprising:

a light source; and a light intensity converter comprising:

a body including a first curved surface extending tranversely of a center axis, a second curved surface extending transversely of said center axis, and an outer peripheral surface extending between said first curved and surface and said second curved surface; and wherein said body is constructed such that a light having first light intensity distribution is made incident to said body at said first curved surface, the incident light diverges in a first area in said body and converges in a second area in said body, by refraction, when the light emerges from said body at said second curved surface, the emerging light having a second light intensity distribution, wherein said first light intensity distribution is a Gaussian distribution, and said second light intensity distribution is a uniform distribution.

12. A light intensity converter comprising:

a body including a first curved surface extending transversely of a center axis, a second curved surface extending transversely of said center axis, and an outer peripheral surface extending between said first curved surface and said second curved surface; and wherein said body is constructed such that a light is made incident to said body at said first curved surface, said first curved surface has an annular protrusion at a peripheral region and concentric depressions inside and outside the annular protrusion so that the incident light diverges in a central area in said body and converges in a peripheral area in said body, by refraction.

13. An optical device comprising:

a light source; and a light intensity converter comprising:

a body including a first curved surface extending tranversely of a center axis, extending between said first curved surface and said second curved surface; and wherein said body is constructed such that a light is made incident to said body at said first curved surface, said first curved surface has an annular protrusion at a peripheral region and concentric depressions inside and outside the annular protrusion so that the incident light diverges in a central area in said body and converges in a peripheral area in said body, by refraction.

14. An optical disk drive comprising a light source, a collimating lens, a light intensity converter, and an object lens:

said light intensity converter comprising:

a body including a first curved surface extending transversely of a center axis, a second curved surface extending transversely of said center axis, and an outer peripheral surface extending between said first curved surface and said second curved surface; and wherein said body is constructed such that a light is made incident to said body at said first curved surface, said first curved surface has an annular protrusion at a peripheral region and concentric depressions inside and outside the annular protrusion so that the incident light diverges in a central area in said body and converges in a peripheral area in said body, by refraction.

* * * * *